Nov. 3, 1925.  1,560,315
J. F. PRENOSIL
BEET BLOCKER
Filed Feb. 7, 1924  2 Sheets-Sheet 1
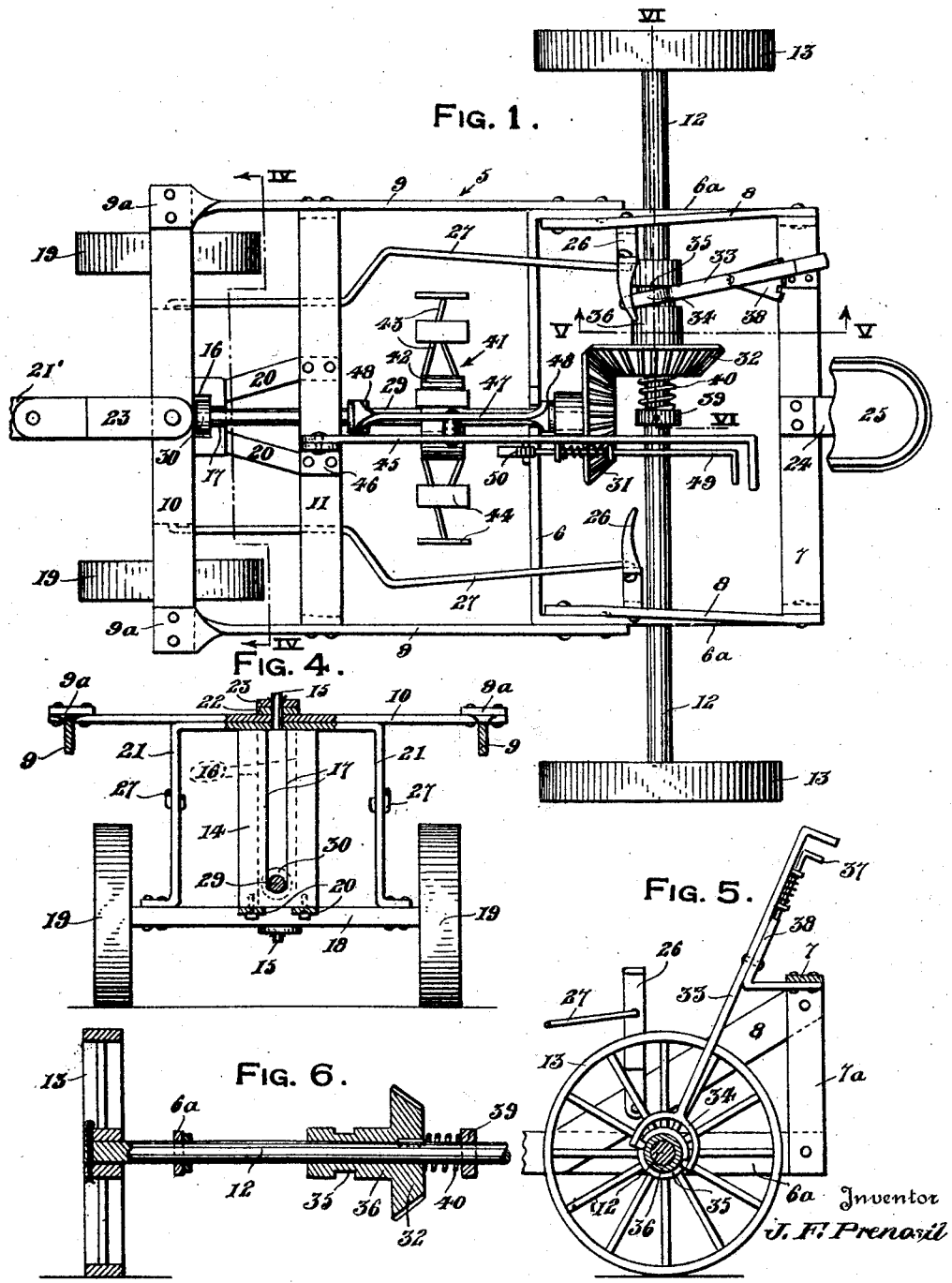

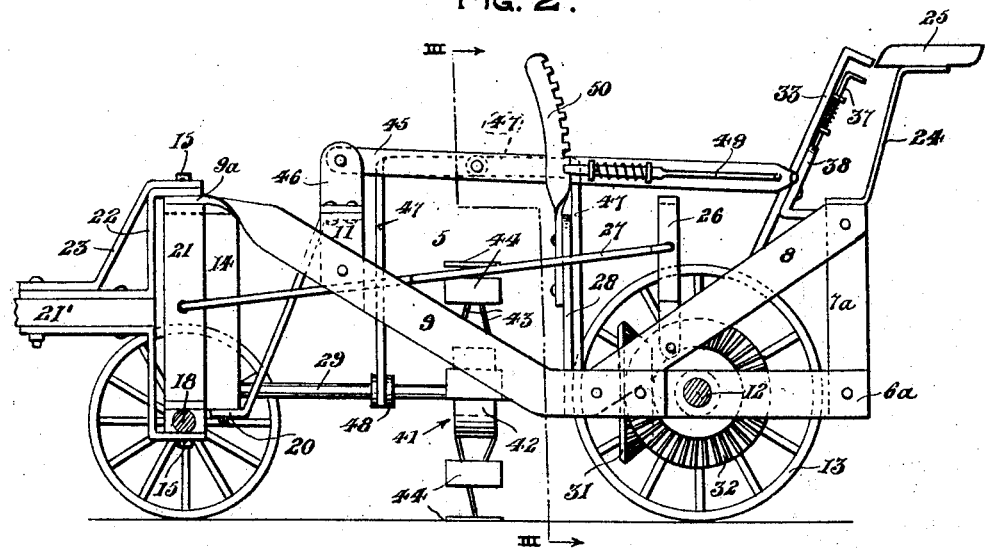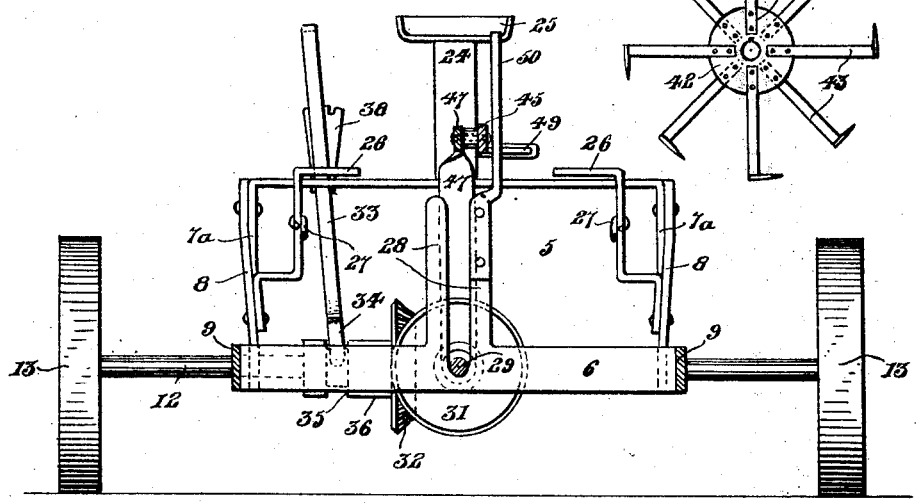

Patented Nov. 3, 1925.

1,560,315

UNITED STATES PATENT OFFICE.

JOSEPH F. PRENOSIL, OF GEORGETOWN, MINNESOTA.

BEET BLOCKER.

Application filed February 7, 1924. Serial No. 691,210.

*To all whom it may concern:*

Be it known that I, JOSEPH F. PRENOSIL, a citizen of the United States of America, residing at Georgetown, in the county of Clay and State of Minnesota, have invented certain new and useful Improvements in Beet Blockers, of which the following is a specification.

This invention relates to new and useful improvements in beet blockers.

An important object of the invention is to provide an agricultural implement of the above mentioned type which will efficiently perform the work of blocking young beet plants and may be used equally as efficiently as a cotton chopper.

A further object of the invention is to provide improved, convenient means for controlling the operation of the chopping blades.

A still further object of the invention is to provide improved means for controlling the direction of travel of the machine so that straight rows or furrows may be formed.

Other objects and advantages of the invention will be apparent during the course of the following description.

In the accompanying drawing forming a part of this specification and in which like numerals are employed to designate like parts throughout the same, Figure 1 is a top plan view of the agricultural implement embodying this invention, Figure 2 is a side elevational view of Fig. 1, Figure 3 is a transverse sectional view taken upon lines III—III of Fig. 2, Figure 4 is a transverse sectional view taken upon line IV—IV of Fig. 1, Figure 5 is a fragmentary longitudinal sectional view taken upon line V—V of Fig. 1, Figure 6 is a fragmentary sectional view taken upon lines VI—VI of Fig. 1, and Figure 7 is a detail elevational view of the rotary cutter embodied in this invention.

In the drawing, wherein for the purpose of illustration is shown the preferred embodiment of this invention, the numeral 5 designates the frame portion of the machine which consists of a horizontally extending U-shaped rear portion 6 having the side arms 6ª. Connected to the rear ends of these side arms 6ª is a vertically extending, inverted U-shaped frame portion 7 having side arm portions 7ª to the upper ends of which the diagonally extending brace arms 8 are secured which extend forwardly and downwardly to be connected to the inner faces of the forward ends of the side arms 6ª. Secured to the forward ends of the side arms 6ª are the forwardly, upwardly extending angular bars 9 which are twisted at their forward ends through 90° of a circle to provide end portions 9ª for the purpose of being connected to a horizontally extending cross bar 10. Secured to the opposite side bars 9 is the substantially inverted U-shaped cross brace 11 which is positioned forwardly of the longitudinal center of the said bars 9. It is to be understood that the elements so far referred to are rigid in respect to each other.

The rear portion of the frame 5 is supported by the rear axle 12 which is journaled in the side arms 6ª and carries the ground engaging wheels 13 which are suitably keyed thereto. In Fig. 4 there is illustrated a perpendicularly extending block 14 having the axially extending integral pins 15 formed at the opposite ends thereof, as illustrated. This block 14 is illustrated in Figs. 1 and 5 as having a vertically extending well 16 formed therein with a slot 17 formed in the rear face thereof and extending from a point spaced slightly from the bottom end of the block 14 and opening through the upper end of the said block. This well 16 and slot 17 will be described more in detail when the utility of the same is set forth. It will be noted that the upper axial pin 15 passes through the forward horizontal bar 10 while the lower pin passes through the front axle 18. This front axle is provided with the loosely mounted front ground engaging wheels 19, as illustrated. For the purpose of bracing the lower end of the block 14, reversely bent braces 20 are secured to the lower end thereof and extend upwardly and rearwardly to be secured to the under face of the transversely extending portion of the substantially U-shaped cross brace 11. Mounted upon the upper axial pin 15, between the upper end of the block 14 and the brace bar 10 is an inverted U-shaped member 21 which is connected at its lower ends to the front axle 18 at points spaced inwardly from the opposite ends thereof. It is to be understood that the braces 20 will prevent the block 14 from moving in respect to the frame portion of the machine and that the axle 18 and inverted U-shaped member 21 are rigid in respect to each other, but are pivotally mounted upon the pins 15 for permitting the axle to be pivoted to steer the vehicle over the ground. In Figs. 1 and 2 there is shown a tongue 21' which is pivotally secured to the pins 15 carried by the block 14 by means of the oppositely extending reversely bent angle brackets 22, one of which engages each of the said pins 15. There is further provided a reversely bent brace 23 which is connected to the tongue 21' at its lower end and to the upper pin 15 at its inner upper end.

Carried by the vertically extending inverted U-shaped frame member 7 is an angle bracket 24 having a driver's seat 25 secured to the upper end thereof. For the purpose of providing means, convenient to the driver upon the seat 25, for steering the implement, foot levers 26 are pivotally secured to the diagonally extending brace bars 8 and are connected, intermediate their ends, to the rods 27 which extend forwardly and are connected to the opposite sides of the inverted U-shaped member 21, as best illustrated in Figs. 1, 2 and 4.

In Figs. 1, 2 and 3, the transversely extending portion of the U-shaped horizontally extending frame part 6 is shown as being provided with a pair of upstanding spaced arms 28 which are so positioned that the space therebetween is in longitudinal alinement with the slot 17 formed in the block 14. Loosely mounted within the slot 17 and the space between the said arms 28 is a horizontally extending driven shaft 29 having an enlarged head 30 at its forward end which is positioned within the well 16. It will be seen that this head 30 and well 16 will prevent longitudinal movement of the said shaft 29. Mounted upon the inner end of this shaft is a beveled gear 31 which is adapted to be placed in mesh with the beveled gear 32 which is longitudinally slidably keyed to the rear axle 12. For the purpose of moving the bevel gear 32 into and out of engagement with the bevel gear 31, a lever 33 is provided, as illustrated. This lever 33 comprises a bifurcated end 34 which engages an annular groove 35 formed in the hub 36 of the bevel gear 32. The upper, handle end of the lever 33 is provided with a spring pressed latch 37, the lower end of which is intended to engage the teeth formed in the rack segment 38 which pivotally supports the said lever 33. For the purpose of normally retaining or urging this bevel gear 32 out of engagement with the bevel gear 31, a collar 39 is rigidly mounted upon the rear axle 12 and has interposed therebetween and the bevel gear 32 a spring 40. It will be seen by this construction that the lever 33 may be operated for aiding the spring 40 to move the bevel gear 32 longitudinally upon the rear axle 12 for disengaging the bevel gears 31 and 32 when the horizontally extending shaft 29 is in the position illustrated in the various figures. It will be seen, by inspecting Figs. 1 and 2, that the horizontally extending shaft 29 is provided with a rotary cutting wheel 41. This cutting wheel is illustrated in detail in Fig. 7 as consisting of a hub portion 42 which is adapted to be keyed to the shaft 29 and is provided with a series of radially extending depressions $42^a$, formed in opposite faces thereof with the recesses formed in one face arranged in staggered relation to the recesses formed on the opposite face. Removably secured within these recesses are the radially extending arms 43 which are provided with the cutting blades 44 which are positioned concentrically with respect to the horizontal driven shaft 29. It will be seen by this construction that when the bevel gears 31 and 32 are in mesh and the implement moving over the ground, the cutting wheel 41 will be rotated for performing the desired work. For the purpose of moving this driven shaft 29 and its cutting wheel 40 upwardly for placing the cutting blades 44 out of operative relation with the ground, a lever 45 is provided which is pivotally connected at its forward end to a bracket 46 projecting upwardly from the inverted U-shaped cross brace 11 and extends at its rear end to a position convenient to the drive occupying the seat 25. Carried by this lever 45, at a point spaced rearwardly from its point of pivotal connection with the bracket 46 is an inverted U-shaped supporting member 47 which is connected to the shaft 29 by means of the journals 48. In proximity to the rear end of this lever 45 is a spring pressed latch 49 which is adapted to normally engage one of the teeth of the arcuate rack 50 which is carried by one of the spaced arms 28, as best illustrated in Fig. 3. It will be seen by this arrangement that the driver positioned within the seat 25 will be able to move the shaft 29 either upwardly or downwardly, within the limits of movement prescribed therefor, and that the shaft 29 will always be retained in a horizontally extending plane.

It is now believed that the operation of this beet blocker will be understood by those skilled in the art, it being noted that when the driver intends to move the cutting blades 44 out of their operative positions in respect to the ground upon which the implement is traveling, the lever 33 is first operated for moving the bevel gear 32 out of engagement with the bevel gear 31. The lever 45 is then moved upwardly for raising the shaft 29 out of the position illustrated in the various figures. The spring pressed latch 49, when engaging one of the teeth in the rack 50, will retain the lever 45 and the shaft 29 in their elevated positions. The implement may then be moved over the ground and the cutting wheel will not be driven. It will be noted in Fig. 2 that when the shaft 29 is positioned upon the same plane as that occupied by the rear axle 12, the spring pressed latch 49 carried by the lever 45 will be in engagement with the lowest tooth formed in the rack 50.

It is to be understood that the form of this invention herewith shown and described is to be taken as a preferred example of the same, and that various changes in the shape, size, and arrangement of parts may be resorted to without departing from the spirit of the invention or the scope of the subjoined claim.

Having thus described the invention, I claim:—

In a device of the class described, a frame including a rear section formed of connected vertical and horizontal U-shaped members, forwardly and upwardly extending side bars connected to the rear section, cross braces connecting the front end portions of the side bars, a rear axle having ground engaging wheels journaled in the rear section, reversely bent brace members extending downwardly and forwardly from the rear one of the cross braces with their lower ends underlying the front cross brace, a vertical block supported by the front cross brace and the ends of the reversely bent brace members, said block having a well formed longitudinally therein and a slot formed in the rear wall thereof, a pair of upstanding spaced arms carried by the horizontal U-shaped frame member, a vertically, bodily shiftable shaft having a head at one end received in the well of the vertical block and projecting through the slot of the same with the remaining end portion of the shaft positioned between the pair of spaced arms, a cutter wheel carried by the shaft, means for connecting the shaft to the rear axle when the shaft is located with the cutting wheel operatively arranged in respect to the ground, and means carried by the rear cross brace for moving said shaft vertically.

In testimony whereof I affix my signature.

JOSEPH F. PRENOSIL.